United States Patent
Walker

(10) Patent No.: US 10,834,869 B2
(45) Date of Patent: Nov. 17, 2020

(54) LIFT ASSEMBLY FOR A LAWNMOWER AND LAWNMOWER HAVING SAME

(71) Applicant: Honda Motor Co., Ltd., Tokyo (JP)

(72) Inventor: Christopher Todd Walker, Hillsborough, NC (US)

(73) Assignee: HONDA MOTOR CO., LTD., Tokyo (JP)

( * ) Notice: Subject to any disclaimer, the term of this patent is extended or adjusted under 35 U.S.C. 154(b) by 21 days.

(21) Appl. No.: 16/281,070

(22) Filed: Feb. 20, 2019

(65) Prior Publication Data
US 2020/0260639 A1    Aug. 20, 2020

(51) Int. Cl.
A01D 34/74 (2006.01)
A01D 34/24 (2006.01)
A01D 34/81 (2006.01)

(52) U.S. Cl.
CPC ........... *A01D 34/243* (2013.01); *A01D 34/81* (2013.01)

(58) Field of Classification Search
CPC .... A01D 34/28; A01D 34/246; A01D 34/243; A01D 34/24; A01D 34/74; A01D 34/81
See application file for complete search history.

(56) References Cited

U.S. PATENT DOCUMENTS

| | | | |
|---|---|---|---|
| 3,063,226 A * | 11/1962 | Pfauser | A01D 34/64 56/15.3 |
| 4,663,923 A | 5/1987 | Boice | |
| 5,123,234 A | 6/1992 | Harada et al. | |
| 5,483,789 A * | 1/1996 | Gummerson | A01D 34/863 56/15.5 |
| 5,553,445 A | 9/1996 | Lamb et al. | |
| 5,771,672 A * | 6/1998 | Gummerson | A01D 34/64 56/15.4 |
| 6,347,502 B1 | 2/2002 | de Vries | |
| 6,625,966 B2 * | 9/2003 | Kaneyuki | A01D 34/64 56/11.4 |
| 7,059,109 B2 * | 6/2006 | Samejima | A01D 34/64 56/17.1 |
| 7,146,786 B2 | 12/2006 | Brandon | |

(Continued)

FOREIGN PATENT DOCUMENTS

| | | |
|---|---|---|
| CN | 203537857 U | 4/2014 |
| CN | 203537858 U | 4/2014 |

(Continued)

*Primary Examiner* — Robert E Pezzuto
*Assistant Examiner* — Madeline Ivy Runco
(74) *Attorney, Agent, or Firm* — Kenealy Vaidya LLP

(57) ABSTRACT

According to an embodiment of the disclosed subject matter, a lift assembly for a lawnmower can include a mower housing configured to house blades for cutting vegetation. A frame can be located above the mower housing, the frame including two longitudinal extending frame members, and at least one pivot bar extending between the two longitudinal extending frame members. A linear actuator can be located adjacent the frame members and connected to the pivot bar such that actuation of the linear actuator causes the pivot bar to rotate about a rotational axis of the pivot bar. At least one cam can be connected to the pivot bar so as to rotate with the pivot bar, the cam including a mower housing attachment element that supports the mower housing such that rotation of the cam varies a distance between the frame and the mower housing.

20 Claims, 6 Drawing Sheets

(56) References Cited

U.S. PATENT DOCUMENTS

| | | | |
|---|---|---|---|
| 7,395,648 B1 | 7/2008 | Silbernagel et al. | |
| 7,540,135 B2* | 6/2009 | Strope | A01D 34/74 56/14.9 |
| 7,578,117 B2* | 8/2009 | Shaffer | A01D 34/74 56/17.1 |
| 7,631,478 B2 | 12/2009 | Henson et al. | |
| 7,669,395 B2 | 3/2010 | Wehler et al. | |
| 7,716,906 B2 | 5/2010 | Swart | |
| 8,578,687 B2* | 11/2013 | Ebihara | A01D 34/78 56/17.1 |
| 9,699,961 B2 | 7/2017 | Ito et al. | |
| 9,820,437 B2* | 11/2017 | Hoppel | A01D 43/00 |
| 9,861,035 B2 | 1/2018 | Kruckeberg et al. | |
| 10,194,586 B2* | 2/2019 | Hoppel | A01D 34/74 |
| 2002/0088217 A1* | 7/2002 | Dennis | A01D 34/74 56/15.8 |
| 2004/0000823 A1 | 1/2004 | Patridge | |
| 2004/0006959 A1* | 1/2004 | Samejima | A01D 34/661 56/14.7 |
| 2008/0256918 A1* | 10/2008 | Kubinski | A01D 34/74 56/17.1 |
| 2009/0064650 A1 | 3/2009 | Eberle et al. | |
| 2015/0296711 A1 | 10/2015 | Haun et al. | |
| 2016/0050847 A1 | 2/2016 | Bartel et al. | |

FOREIGN PATENT DOCUMENTS

| | | |
|---|---|---|
| CN | 205284170 U | 6/2016 |
| CN | 205884034 U | 1/2017 |
| CN | 107517643 A | 12/2017 |
| EP | 3231271 A1 | 10/2017 |
| WO | 2007019726 A1 | 2/2007 |

\* cited by examiner

LIFT ASSEMBLY FOR A LAWNMOWER AND LAWNMOWER HAVING SAME

BACKGROUND

Lawnmowers can be configured as garden tractors, riding mowers, commercial walk-behind mowers and smaller walk-behind mowers. Mower decks associated with lawnmowers can be movably attached to the frame of the particular lawnmower so as to be adjustable in height. A mower deck or mower housing can be provided with a cutting chamber. The cutting chamber can house one or more blades. The one or more blades can be operatively rotated so as to cut grass on a lawn or other vegetation.

SUMMARY

In accordance with an aspect of the disclosed subject matter, a lift assembly for a lawnmower can include a mower housing configured to house blades for cutting vegetation. A frame can be located above the mower housing, the frame including two longitudinal extending frame members, and at least one pivot bar extending between the two longitudinal extending frame members. A linear actuator can be located adjacent the frame members and connected to the pivot bar such that actuation of the linear actuator causes the pivot bar to rotate about a rotational axis of the pivot bar. At least one cam can be connected to the pivot bar so as to rotate with the pivot bar. The cam can include a mower housing attachment element that supports the mower housing such that rotation of the cam varies a distance between the frame and the mower housing.

In accordance with another aspect of the disclosed subject matter, a lawnmower can include a lift assembly that has a mower housing that rotatably supports blades for cutting vegetation. Two frame members can be provided, and a pivot bar can extend between the two frame members. An actuator can be provided between the two frame members and configured to impart rotation to the pivot bar about a rotational axis of the pivot bar. At least one cam can be affixed to the pivot bar and include a mower housing attachment element connected to the mower housing such that a distance from the two frame members to the mower housing changes upon rotation of the at least one cam. A prime mover can be operatively connected to the blades so as to rotate the blades during operation.

BRIEF DESCRIPTION OF THE DRAWINGS

The disclosed subject matter of the present application will now be described in more detail with reference to exemplary embodiments of the apparatus and method, given by way of example, and with reference to the accompanying drawings, in which.

DETAILED DESCRIPTION OF EXEMPLARY EMBODIMENTS

A few inventive aspects of the disclosed embodiments are explained in detail below with reference to the various figures. Exemplary embodiments are described to illustrate the disclosed subject matter, not to limit its scope, which is defined by the claims. Those of ordinary skill in the art will recognize a number of equivalent variations of the various features provided in the description that follows.

Some lawnmowers include cutter housings or mower decks that can be adjusted in height. Such adjustment in height can be beneficial in that the adjustment allows the operator to vary a cut length of the lawn. However, known height adjustment arrangements for cutter housings can be difficult to manipulate or can be prone to breakage and high maintenance time and cost. For example, some known height adjustment arrangements can include a lever, on a side of a riding lawnmower, that the operator manipulates to vary the height of the cutter housing. With such an arrangement, the operator may need to stop the lawnmower to perform required manipulation of the lever so as to vary the height of the cutter housing. Accordingly, height adjustment of the cutter housing can be perceived as burdensome to the operator of the particular lawnmower. Thus, there is a need for a cutter housing height adjustment arrangement that can lessen or avoid any inconvenience perceived by the operator when adjusting the height of a mower deck or cutter housing, and that reduces maintenance time and cost.

Figure 1:
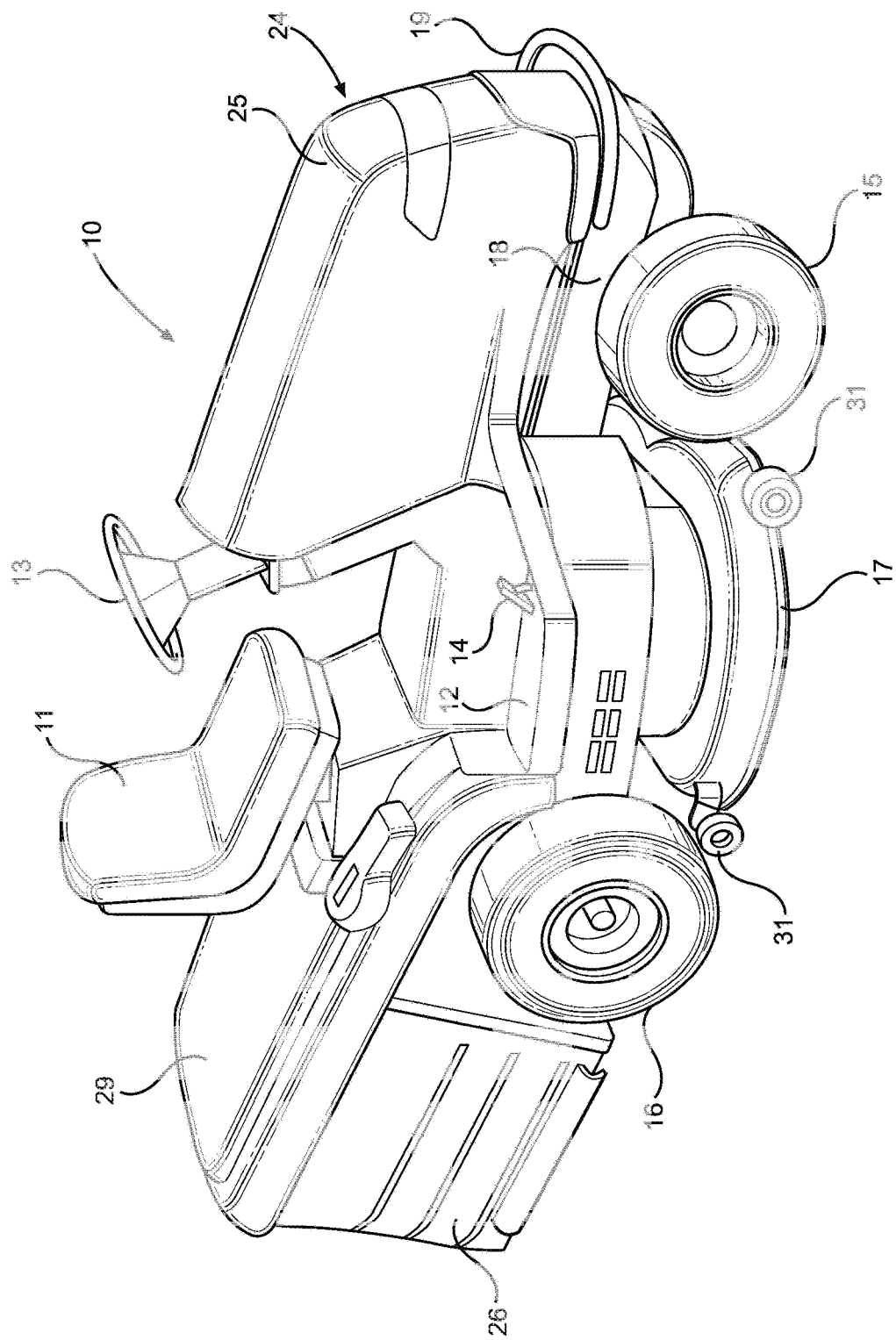
FIG. 1 is a perspective view of a lawnmower made in accordance with principles of the disclosed subject matter.

FIG. 1 is a perspective view of a lawnmower 10 made in accordance with principles of the disclosed subject matter. The lawnmower 10 can be in the form of a riding lawnmower or a garden tractor. The lawnmower 10 can be driven by a human operator who is supported by a seat 11 and one or more foot supports 12.

The lawnmower 10 can be operated on a lawn, terrain, or other surface. The operator can control various aspects of movement of the lawnmower 10 including direction of travel and speed of travel. Control of movement of the lawnmower 10, by the operator, can be provided by a steering wheel or other steering mechanism 13, one or more control pedals 14, and other control mechanisms. The steering wheel 13 can control turning of front wheels 15 of the lawnmower 10. The one or more control pedals 14 can be provided on or adjacent to the foot supports 12 of the lawnmower 10. For example, a control pedal 14 can be provided to control travel speed of the lawnmower 10 and/or whether the lawnmower 10 moves in a forward direction or reverse direction.

The lawnmower 10 can include the front wheels 15 and rear wheels 16. FIG. 1 shows three wheels. A fourth wheel can be provided at the left rear of the lawnmower. Such fourth wheel is obstructed from view in FIG. 1.

The lawnmower 10 can include a cutter housing 17. The cutter housing 17 can also be referred to as a deck or as a mower deck or as a cutter deck of the lawnmower 10. The cutter housing 17 can support one or more blades therein. The blade(s) can rotate in a cutting chamber defined by the cutter housing 17 which is opened toward the ground. In operation of the lawnmower 10, a prime mover 18 can rotate a driveshaft connected to the one or more blades so as to rotate the one or more blades. As a result, the lawnmower can perform a mowing operation on vegetation, which can include or be in the form of a lawn. The prime mover 18 can be in the form of a gasoline engine or an electric motor or other known motor device. The prime mover 18 can also power one or more wheels 15, 16 of the lawnmower, as controlled by the operator. For example, the prime mover can power the two rear wheels 16 of the lawnmower such that the two rear wheels 16 are the powered wheels.

The lawnmower 10 can include a frame or chassis 19. The frame 19 can provide a main supporting structure of the lawnmower 10 to which various components of the lawnmower 10 are attached. The wheels 15, 16 can be attached to axles that in turn can be attached to the frame 19 of the lawnmower. The prime mover 18 can be attached to the frame 19 and mechanically connected to the powered wheels so as to power the lawnmower 10. As described above, the prime mover 18 can also power the one or more blades in the cutter housing 17, such as by using a blade drive assembly. For example, a mower driveshaft can be powered by the prime mover and supported by the prime mover and/or the frame. The motor driveshaft can, in turn, support a driving pulley. Each of the blades that are provided in the cutter housing can be supported by a driven shaft. The driven shaft can be rotatably supported by the cutter housing 17 such as by using a bearing arrangement. The driven shaft can extend above the cutter housing and support a driven pulley. The driving pulley(s) (powered by the prime mover) can power the driven pulley (so as to power the mower blade) in a selective manner. For example, the driving pulley(s) can be selectively engaged or disengaged with the driven pulley so as to selectively power the driven pulley. Such engagement and disengagement can be provided by selective tightening or loosening of a belt that extends around both the driving pulley and the driven pulley. Such tightening or loosening of the belt can be controlled by position of an engagement pulley, which can be controlled by the operator in some manner, such as by a lever.

The frame of the lawnmower can also support a body 24 of the lawnmower 10. The body 24 can provide an outer, finished surface that covers the frame 19, prime mover 18, and other components or portions of components of the lawnmower 10. The body 24 can include an engine hood 25. The engine hood 25 can cover at least a portion of the prime mover 18. The foot support(s) 12, as described above, can be integrally formed and/or supported by the body 24 of the lawnmower 10.

The lawnmower 10 can also include a collection bag 26. The collection bag 26 can be supported by the frame 19 of the lawnmower. The collection bag 26 can be supported by rods or other structural supports that extend rearwardly from a portion of the frame above or adjacent to the rear wheels 16. A discharge opening 27 and/or passageway can be provided to transfer clippings from the cutting chamber 28 to the collection bag 26 when the lawnmower 10 is in a discharge mode. The body 24 of the lawnmower 10 can include a collection bag cover 29 that is positioned over and/or covers the collection bag 26. Accordingly, the body 24 of the lawnmower 10, including the engine hood 25, collection bag cover 29, and other components of the body 24 can provide an aesthetically pleasing appearance to the lawnmower.

As described in detail below, the lawnmower 10 can include a lift assembly, i.e. a cutter housing lift assembly, that controls height of the cutter housing 17 relative to the ground (and relative to the frame that suspends the cutter housing 17). The height of the cutter housing 17 relative to ground can be controlled so as to be positioned between a raised position and a lowered position. In the raised position, the cutter housing 17 with blades can be positioned so as to provide a "long cut" to a lawn. In the lowered position, the cutter housing 17 with blades can be positioned so as to provide a "short cut" into the lawn. Various interim positions, between the raised position and the lowered position, can be provided, as described below. The height of the cutter housing 17 can be controlled by the human operator riding on the lawnmower 10.

The cutter housing 17 can be provided with housing wheels or housing rollers 31. A housing roller 31 can be provided at or adjacent to a rear of the cutter housing. A housing roller 31 can also be provided at or adjacent to a front of the cutter housing. Housing rollers 31 can be provided on both the left and right sides of the cutter housing. The housing rollers 31 can also further limit how close the cutter housing or particular portion of the cutter housing gets into the lawn. Illustratively, if the lawnmower passes over a bump or high point in a lawn, the housing wheel(s) 31 can engage the bump so as to prevent "scalping" of the lawn and/or so as to prevent the blades of the lawnmower 10 from engaging with the earth of the lawn. The particular position and number of the housing rollers or housing wheels 31 can be varied as desired.

Figure 2:
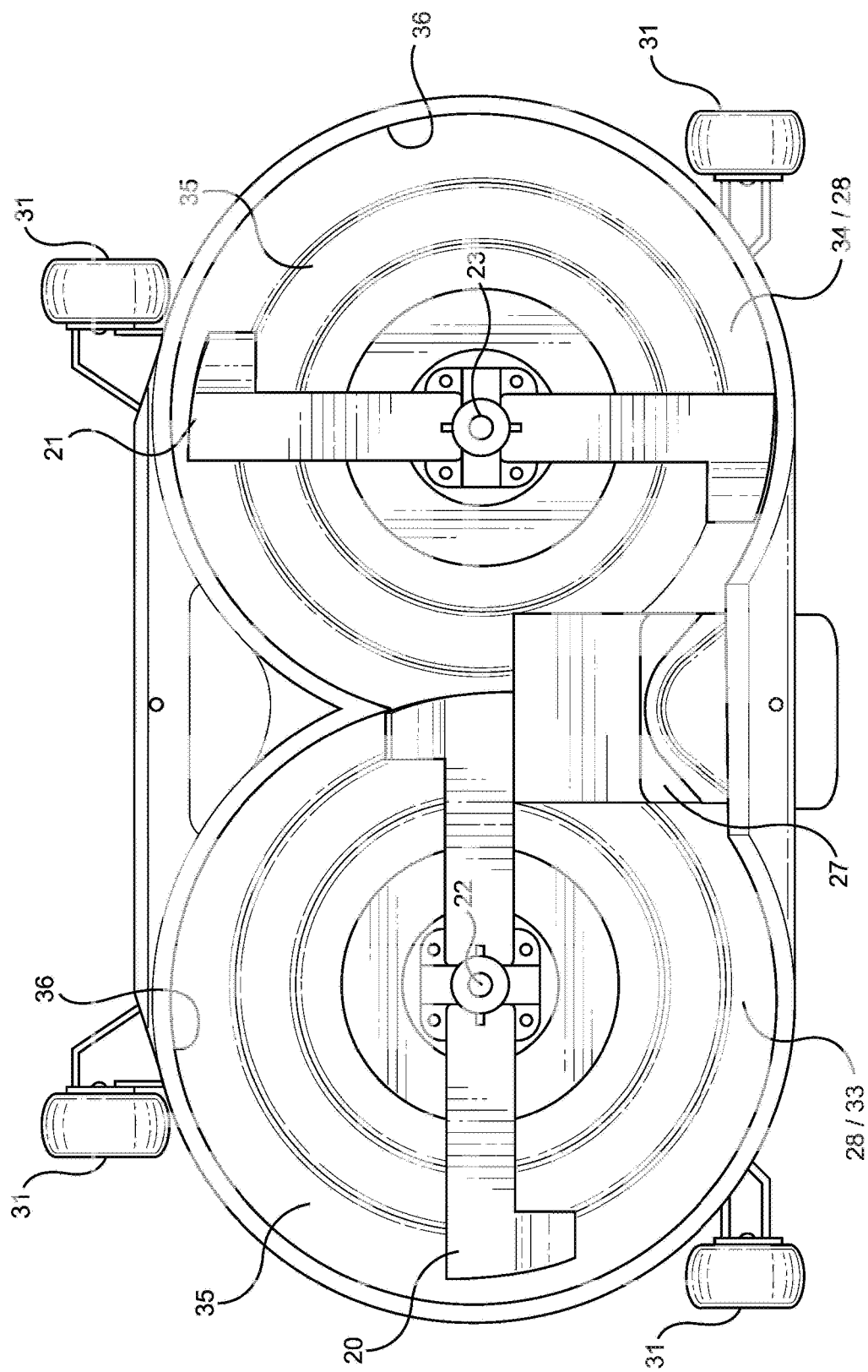
FIG. 2 is a bottom view of a cutter housing of the lawnmower of FIG. 1.

FIG. 2 is a bottom view of the cutter housing 17 shown in FIG. 1. The cutter housing 17 or mower deck can include a first cutting chamber 33 and a second cutting chamber 34. In other arrangements, additional cutting chambers can be provided. The first cutting chamber 33 houses a first blade 20 connected to a drive post 22. The second cutting chamber houses a second blade 21 connected to a drive post 23. The first blade 20 and the second blade 21 can be driven, so as to cut grass or other vegetation, as described above.

FIG. 2 illustrates a synchronous cutter housing layout. In a synchronous cutter housing layout, rotation of the first blade 20 is synchronized with rotation of the second blade 21. This synchronization of the two cutting blades can be performed by mechanically connecting the first blade 20 to the second blade 21, such as by utilizing a "timing belt" or "synchronous belt" or other similar arrangement. In the illustrated synchronous cutter housing layout, the inner rotational path of an outer edge of the first blade will pass over the inner rotational path of an outer edge of the second blade, i.e. so as to provide "crossover" of the two blades 20, 21. Accordingly, synchronizing rotation of the first blade 20 with rotation of the second blade 21 can prevent the two blades from colliding or interfering with each other. Such "crossover" of the two blades 20, 21 can be desired so as to provide effective "cutting coverage" of the lawn. In other words, such crossover of the two blades 20, 21 can be desired so that lawn is effectively cut between the blades, such that no portion of lawn or grass is missed between the two blades 20, 21.

The cutter housing can include a top wall 35 and one or more sidewalls 36 that extend downward from the top wall 35 and toward the ground. The top wall 35 can be demarcated from the sidewall(s) 36 by the top wall 35 having a substantially horizontal disposition and the sidewalls 36 having a substantially vertical disposition. The top wall 35 can be demarcated from the sidewall(s) 36 by being constructed of respective parts and/or being separated by a particular feature of the lawnmower 10, such as a distinct bend or ridge in the cutter housing. The top wall 35 can be integrally formed with the sidewall(s) 36. The top wall 35 and the sidewall(s) 36 can define the multiple cutting chambers 28 of a particular cutter housing 17, such as the first cutting chamber 33 and the second cutting chamber 34 shown in FIG. 2. For example, the top wall 35 and the sidewall(s) 36 can be integrally formed of stamped or cast metal or of molded plastic construction.

The cutter housing 17 can include a rear discharge layout. That is, a discharge opening 27 can be provided in the cutter housing 17. In operation, lawn clippings can be ejected from the first cutting chamber 33 and the second cutting chamber 34 through the discharge opening 27 and into a passageway that communicates with the collection bag 26. It is appreciated that the size and particular positioning of the discharge opening 27 can be varied as may be desired.

Figure 3:
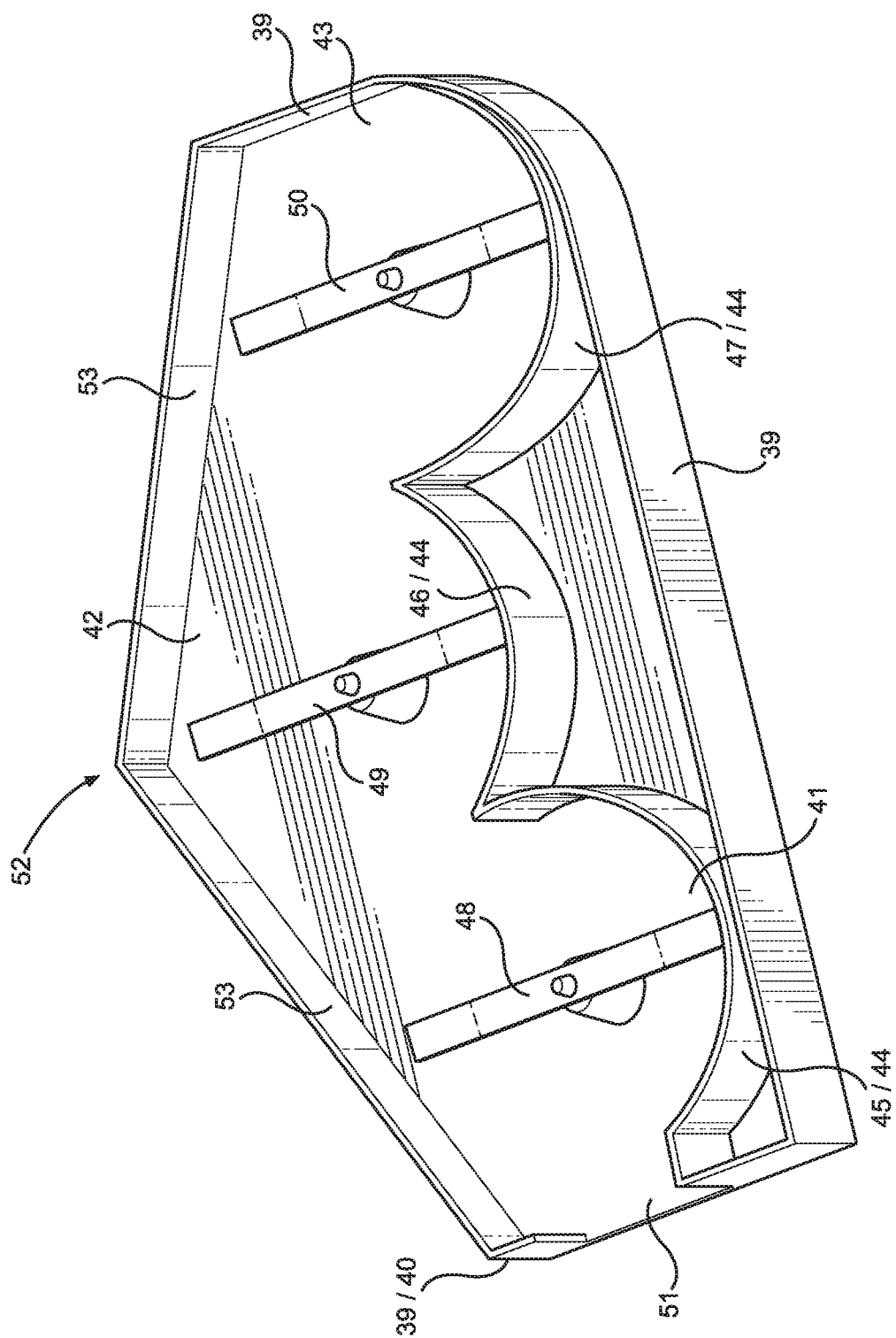
FIG. 3 is a bottom view of another embodiment of a cutter housing made in accordance with principles of the disclosed subject matter.

FIG. 3 is a bottom view of another embodiment of a cutter housing 52 made in accordance with principles of the disclosure. The cutter housing 52 can include a first cutting chamber 41, a second cutting chamber 42, and a third cutting chamber 43. The cutting chambers 41, 42, 43 can be demarcated or defined by side walls 39 and/or chamber walls 44. The sidewalls 39 can include a front side wall 40. The chamber walls 44 can include a first chamber wall 45, a second chamber wall 46, and a third chamber wall 47. The first chamber wall 45 can serve to demarcate, at least in part, the first cutting chamber 41. The second chamber wall 46 can serve to demarcate, at least in part, the second cutting chamber 42. The third chamber wall 47 can serve to demarcate, at least in part, the third cutting chamber 43.

Each of the cutting chambers 41, 42, 43 can be provided with a respective rotating blade 48, 49, 50. Each of the rotating blades can be supported by a driven shaft. Each of the driven shafts can be mechanically powered by the prime mover of the particular lawnmower, in conjunction with a mechanical power transfer arrangement, such as a pulley(s) and belt arrangement.

The cutter housing 52 of FIG. 3 is provided, as illustrated, with a side discharge layout. The side discharge layout can include a discharge opening 51 on the left-hand side as shown in FIG. 3, i.e. with the cutter housing upside down. From a bottom view, as shown in FIG. 3, the blades 48, 49, 50 can spin in a counterclockwise manner. As a result, lawn clippings are propelled, due to the airflow within the cutter housing 52, along the front side wall 40 and towards the discharge opening 51. The lawn clippings are then ejected from the discharge opening 51. The side discharge layout of FIG. 3 can include a bottom flange 53 that can be connected to a lower edge of the front side wall 40. The bottom flange 53 can extend inwardly from the front side wall 40. The front side wall 40 in conjunction with the bottom flange 53 can provide a gutter, channel, or trough along the front side wall 40 of the cutter housing through which air can flow along with grass clippings.

The lawnmower can include a cutter housing lift assembly that controls height of the cutter housing or deck. The height of the cutter housing can be controlled so as to be positioned between a raised position and a lowered position, as well as positioned in interim positions between the raised position and the lowered position.

Figure 4:
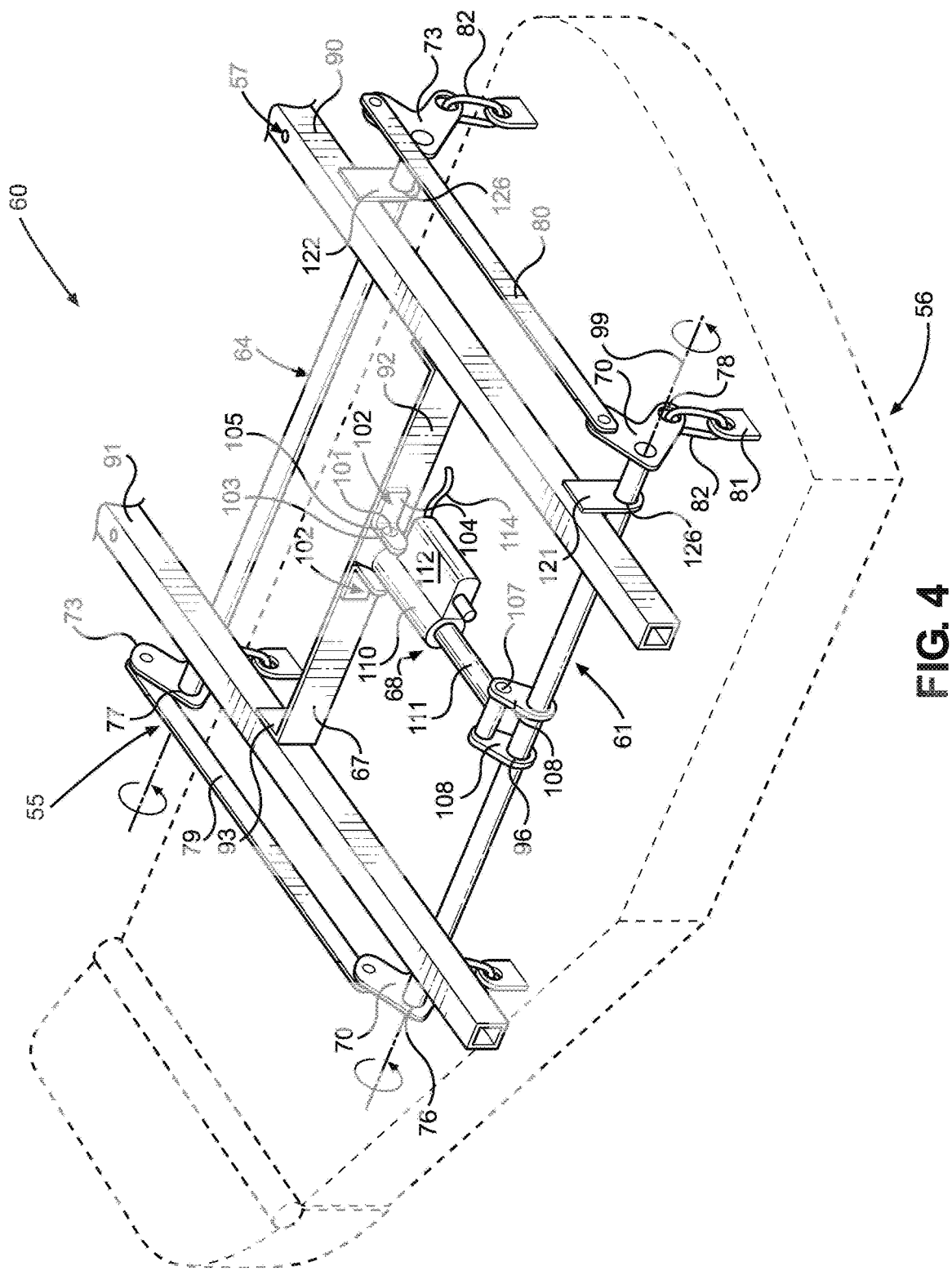
FIG. 4 is a top perspective view of an embodiment of a mower assembly with lift assembly, mower housing and machine frame, made in accordance with principles of the disclosed subject matter.

FIG. 4 is a top perspective view of an embodiment of a mower housing assembly 60 with lift assembly 55 made in accordance with principles of the disclosure.

The mower housing 56, of the mower assembly 60, can be of various shapes and constructions. For example, the mower housing 56 can be constructed similar to the mower housing of FIG. 2 or the mower housing of FIG. 3. Various additional mower housing types can be used with the lift assembly 55 of the disclosure.

The mower housing 56 can operatively support blades provided to cut vegetation. The lift assembly 55 can include a first pivot bar 61 and a second pivot bar 64. The machine frame 57 can include a frame cross member 67. An actuator, such as linear actuator 68, can be provided between the frame cross member 67 and the pivot bar 61. The linear actuator 68 can be configured to impart rotation to the pivot bar 61 about a rotational (longitudinal) axis of the pivot bar 61.

As shown in FIG. 4, first cams 70 can be affixed to the first pivot bar 61, at respective attachment points 76 of the first pivot bar 61, so as to rotate with the first pivot bar 61. Second cams 73 can be affixed to the second pivot bar 64, at respective attachment points 77 of the second pivot bar 64, so as to rotate with the second pivot bar 64. Each of the cams 70, 73 can include a mower housing attachment element 78. Each mower housing attachment element 78 can be provided to support, such as by a hanger, the mower housing 56 at varying height positions relative to the frame members 90, 91, 92 or ground, and dependent on rotational position of the cams 70, 73.

The lift assembly 55 can further include a first link arm 79 and a second link arm 80. The first link arm 79 can connect one of the first cams 70 to one of the second cams 73. As a result of such connection, rotation of the cam 70 can cause rotation of second cam 73. In other words, the first cams 70 can be mechanically connected to the second cams 73 so that the cams 70, 73 rotate together.

The second link arm 80 can be configured in a similar manner as link arm 79 relative to a respective first cam and second cam associated with the link arm 80.

Each of the cams 70, 73 can include a mower housing attachment element. Each of the mower housing attachment elements can include an attachment aperture 78 in the particular cam connected to a hanger 82. Such attachment aperture 78 can be provided at or proximate an end 83 of a support arm 84 of the particular cam. The hanger 82 can be in the form of a link, chain-link, loop, damper, or similar structure, for example. The mower housing 56 can include a plurality of support elements 81 that connect to a respective hanger 82. With such arrangement, the mower housing 56 can be supported or hung at a desired height above the lawn being cut, while still affording some flexibility in position of the mower housing 56 relative the machine frame 57 and other connected structure, including the wheels of the particular lawnmower.

As shown in FIGS. 4-7, cam 70 can include a driving arm 86 that includes a linking attachment element 87 that can be connected to a first end of the first link arm 79. The support arm 84 of the first cam 70 can be connected to the driving arm 86 at an elbow 89 of the cam 70. The first cam 70 can be connected to the first pivot bar 61 at elbow 89.

The other cams can be of same or similar structure and/or same or similar arrangement to that of cam 70. For example, the cams 73 can be connected to the second pivot bar 64 at an elbow, and cams 73 can be configured similar to cam 70.

The machine frame 57 can include a left frame member 90 and a right frame member 91. A frame cross member 67 can extend between the left frame member 90 and the right frame member 91. Each of the left frame member 90 and the right frame member 91 can be in the form of a cylindrical structure or tube structure, which can be square or round in cross-sectional shape, for example. The frame cross member 67 can include a vertical beam portion 92 and angled attachment portions 93 at opposing ends of the vertical beam portion 92. For example, each angled attachment portion 93 can be oriented at right angles relative to the vertical beam portion 92 and connected to the vertical beam portion 92 at a bend. Each of the attachment portions can be welded to a corresponding frame member 90, 91. Alternatively, each of the attachment portions 93 can be mechanically attached to a corresponding frame member 90, 91 such as via bolts or other mechanical attachment devices or arrangements.

The left frame member 90 and the right frame member 91 can rotatably support the first pivot bar 61. For example, suitable bearings or other rotational devices or arrangements can rotatably attach the first pivot bar 61 to the left frame member 90 and to the right frame member 91. The left frame member 90 and the right frame member 91 can also rotatably support the second pivot bar 64 in a similar manner. The first and second pivot bars 61, 64 can be in the form of a tube, rod, shaft, or similar structure, for example.

The linear actuator 68 can be disposed or provided between and have a longitudinal axis that is substantially parallel with the left frame member 90 and the right frame member 91. Accordingly, the linear actuator 68 can be disposed inboard of both the left frame member 90 and the rate frame member 91. The first link arm 79 can be disposed outboard of and substantially parallel with the left frame member 90. The second link arm 80 can be disposed outboard of and substantially parallel with the right frame member 91.

The first pivot bar 61 can also include an arm 96 that is non-rotatably affixed or attached thereto. For example, the arm 96 can be welded, soldered, or otherwise mechanically attached to the first pivot bar 61. The linear actuator 68, at a first end of the linear actuator, can be pivotally attached to the frame cross member 67. The linear actuator 68, at a second end of the linear actuator, can be pivotally attached to the arm 96. With such arrangement, extension of the linear actuator 68, i.e. an increase in length of the linear actuator 68, results in rotation of the arm 96. The arm 96 is affixed or welded to the first pivot bar 61. Accordingly, the rotation of the arm 96 results in rotation of the first pivot bar 61. Specifically, both the arm 96 and the first pivot bar 61 can rotate about a pivot axis 99 of the first pivot bar 61. Both cams 70 can be non-rotatably attached or affixed to opposing ends of the first pivot bar 61. Accordingly, the cams 70 rotate along with rotation of the first pivot bar 61. The mower housing attachment element aperture 78 of each cam can be offset from the pivot axis 99 of the first pivot bar 61. As result of such offset, rotation of the first pivot bar 61 results in change in position of the mower housing attachment elements aperture 78, of the cams 70, 73. Specifically, such change in position can vary a vertical height of each of the mower housing attachment elements. Due to the mechanical attachment of each of the mower housing attachment elements to the mower housing 56, such as by utilizing respective hangers or links 82, such variance in vertical height of each of the mower housing attachment elements results in change in vertical height of the mower housing 56. Accordingly, operation of the linear actuator 68 can be controlled so as to vary the vertical height of the mower housing 56.

As illustrated in FIG. 4, a first end of the linear actuator 68 can be pivotally attached to the frame cross member 67 utilizing a first pin 101 or other rotational arrangement. For example, a ball and socket joint can be utilized so as to provide rotation of the linear actuator 68 relative to the frame cross member 67. In the arrangement shown in FIG. 4, a pair of angled flanges 102 may be utilized to support the first pin 101. Each of the angled flanges 102 can include a connection portion 103 that is welded or otherwise mechanically attached to the frame cross member 67. Each of the angled flanges 102 can include a support portion 104, at right-angle to the connection portion 103, that includes a pin aperture 105. The first pin 101 can be rotatably retained in the pair of pin apertures 105, which are provided by the pair of angled flanges 102. The linear actuator 68 can include a bulbous or enlarged first end that houses or supports the first pin 101. The first pin 101 can be fixedly attached to or integrally formed with the first end of the linear actuator.

The second end of the linear actuator 68 can include a second pin 107 or other rotational arrangement. For example, a ball and socket joint can be utilized so as to provide rotation of the linear actuator 68 relative to the arm 96. In the arrangement shown in FIG. 4, the arm 96 can include a pair of flanges 108 that are each welded or otherwise affixed to the first pivot bar 61. Each of the pair of flanges 108, of the arm 96, can include a pin aperture to receive a second pin 107.

Figure 8:
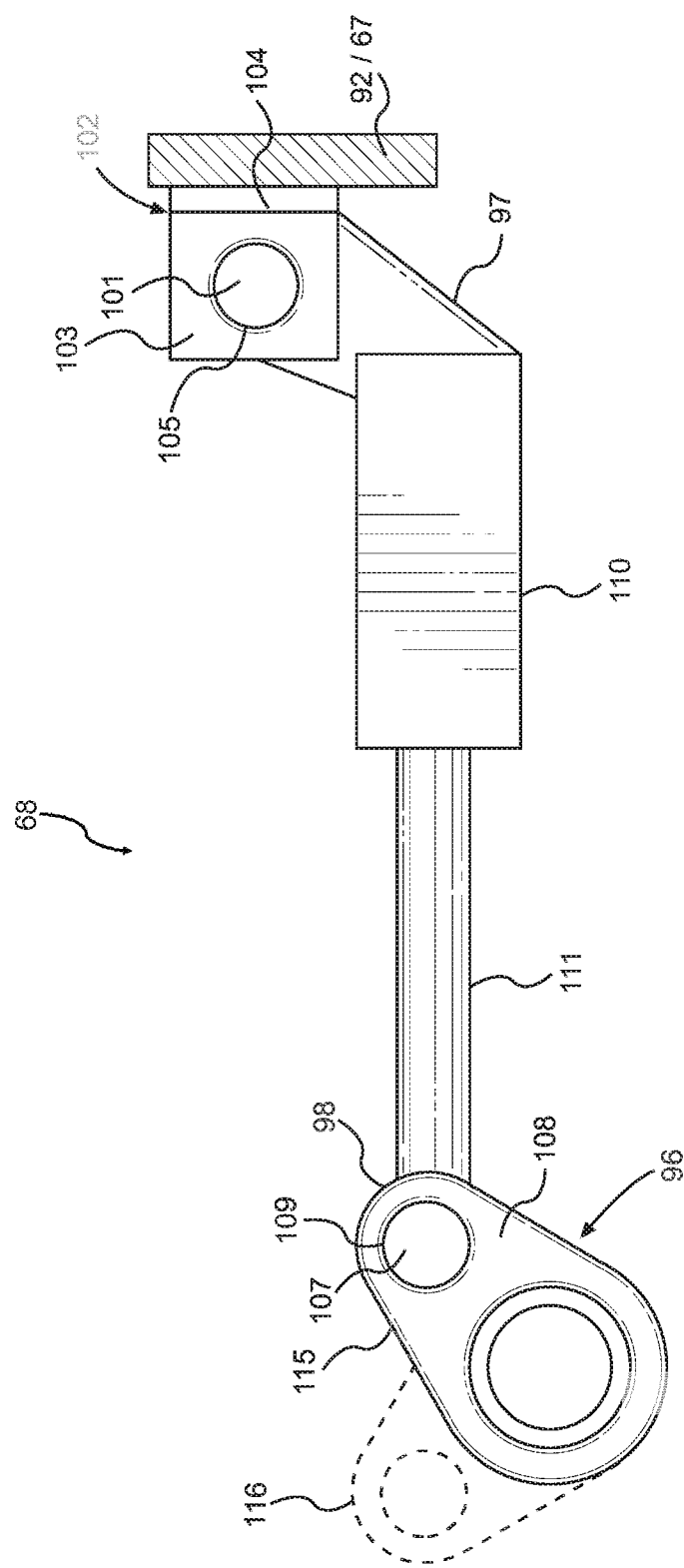
FIG. 8 is a side view of the linear actuator and associated structure of FIG. 4.

FIG. 8 is a side perspective view of the linear actuator 68 and associated structure, made in accordance with principles of the disclosure. The linear actuator 68 can include a cylinder 110 and a piston 111. The piston 111 can be slidably disposed within the cylinder 110 so as to slide or reciprocate between a fully extended position and a fully withdrawn position. In this manner, the linear actuator 68 provides motion in a straight line. It is of course appreciated that various interim positions can be attained between the fully extended position and the fully withdrawn position of the linear actuator 68. The linear actuator 68 can include a power unit 112. The power unit 112 can be mechanically attached to the cylinder 110 so as to control position of the piston 111 within the cylinder 110. For example, the power unit 112 can include a motor. Rotary motion of the motor can be converted to linear motion of the piston 111, sliding within the cylinder 110, utilizing a mechanical arrangement. For example, the motor can rotate a drive screw having internal threads that mate with external threads on the piston 111. The power unit 112 can alternatively be a hydraulic actuator or a pneumatic actuator that powers the piston 111 into and out of the cylinder 110.

The power unit 112 can be connected to an electrical harness 114 that is in turn connected to a switch with power source or other control mechanism of the lawnmower. The switch can be used or manipulated by a human operator of the lawnmower so as to control the motor of the linear actuator, and more specifically, direction, position, and speed of the motor.

As shown in solid line, FIG. 8 illustrates a first rotational position 115 of the arm 96. As shown in phantom line, FIG. 8 also illustrates a second rotational position 116 of the arm 96. The first rotational position 115 of the arm 96 results from the piston 111 being disposed at least partially retracted into the cylinder 110. The second rotational position 116 of the arm 96 is provided as a result of the piston 111 extending from the cylinder 110. Accordingly, rotation of the arm results in rotation of the affixed first pivot bar and the cams as described above. Due to the mechanical arrangement of the lift assembly described above, this motion of the cams results in variance in height of the mower housing.

Figure 5:
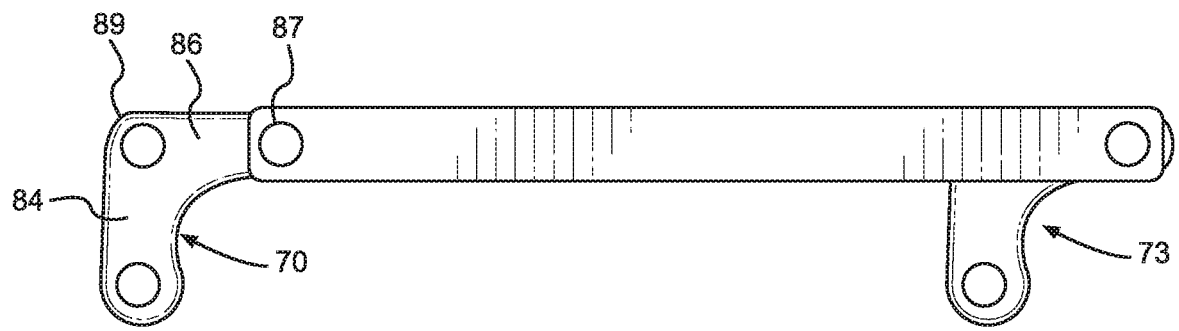
FIG. 5 is a side view of two cams with link arm of FIG. 4 in a first disposition.
Figure 6:
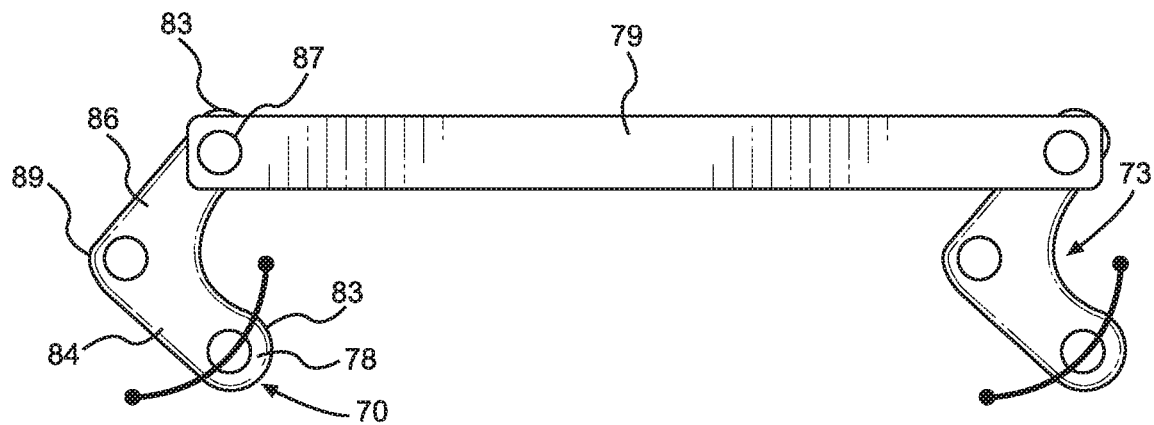
FIG. 6 is a side view of two cams with link arm of FIG. 4 in a second disposition.
Figure 7:
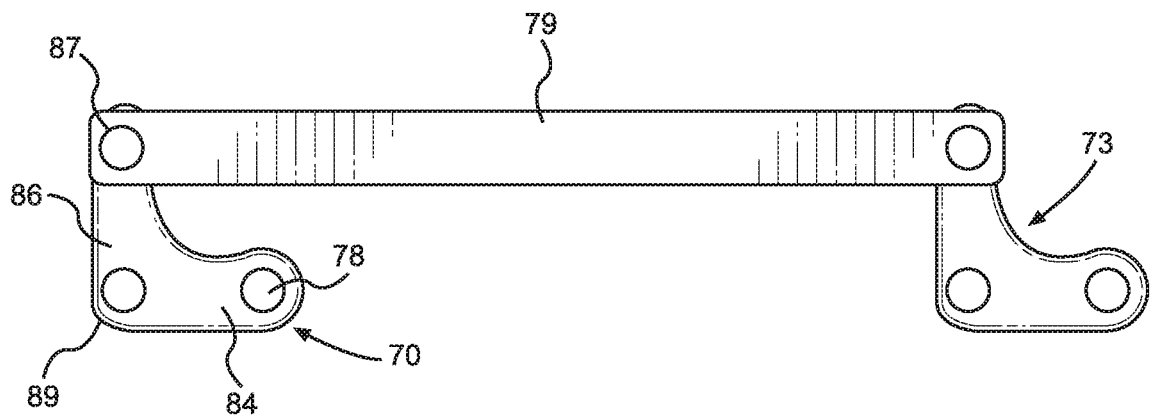
FIG. 7 is a side view of two cams with link arm of FIG. 4 in a third disposition.

FIGS. 5-7 are side views of two cams 70, 73 with link arm 79. FIGS. 5-7 illustrate how rotation of all cams of the lift assembly is coordinated. FIGS. 5-7 show a first link arm 79 connected to the two cams 70, 73. Cam 70 can be operationally connected to cam 73 via link arm 79. Accordingly, rotation of the cam 70 can result in rotation of the cam 73.

FIG. 6 depicts an interim position of the cams 70, 73 so as to provide an interim height position of connected mower housing 56. FIG. 5 shows the cam 70 rotated clockwise relative to the positioning shown in FIG. 6. As a result of such rotation, the motor housing attachment element, which may include an aperture, is positioned at its lowest point in rotation. Accordingly, such position may correspond with a lowest height of the connected mower housing 56.

In contrast, FIG. 7 shows the cam 70 rotated counterclockwise relative to the positioning shown in FIG. 6. As a result of such rotation, the motor housing attachment element is positioned at a higher position than that shown in FIG. 6. As a result, the mower housing 56 will be supported at a higher position than with the arrangement shown in FIG. 6. It may be possible, in some arrangements, to rotate the cams of FIG. 7 further counterclockwise so as to attain a yet higher position of the mower housing 56. However, at some point, in some arrangements, connective structure may prevent further rotation. For example, at a point, hangers passing through the mower housing attachment element 78 may bump up against the first link arm 79 so as to prevent further rotation, and relatedly, so as to prevent further raising of the mower housing 56.

As described above, the first pivot bar 61 and the second pivot bar 64 can be rotatably supported by the left frame member 90 and the right frame member 91. The left frame member 90 can include left forward tab 121 and left rearward tab 122. The right frame member 91 can include right forward tab and right rearward tab (not shown as such is obstructed by the right frame member 91). Each of the tabs 121, 122 can be provided with an aperture 126. Accordingly, the left forward tab 121 with corresponding aperture 126 and the right forward tab with corresponding aperture can support the first pivot bar 61, i.e. the front pivot bar. Accordingly, the left rearward tab 122 with corresponding aperture 126 and the right rearward tab with corresponding aperture can support the second pivot bar 64, i.e. the rearward pivot bar.

As shown in FIG. 4, the first pivot bar 61 can be positioned in front of the second pivot bar 64 (along or with respect to a longitudinal or driving axis of the lawnmower). Accordingly, the first pivot bar 61 can also be characterized as a front pivot bar and the second pivot bar 64 can be characterized as a rear pivot bar.

It is appreciated that the various components of embodiments of the disclosure can be made from any of a variety of materials including, for example, metal, plastic, plastic resin, nylon, composite material, and/or rubber, for example, or any other material as may be desired.

A variety of production techniques can be used to make the mechanisms and components as described herein. For example, suitable casting and/or injection molding and other molding techniques, extrusion and other manufacturing techniques might be utilized. Also, metal stamping or cutting can be utilized. For example, metal stamping or cutting can be utilized in construction of the various components of the lift assembly.

For example, embodiments are disclosed above in which each of the cams is constructed of a single or unitary piece. However, embodiments are intended to include or otherwise cover a cam that includes or is constructed of multiple pieces. For example, the multiple pieces of cams 70, 73 can be separately stamped of sheet-metal and then connected together by mechanical or material fasteners or welds.

For example, embodiments are disclosed above in which each cam is attached to a corresponding support element, of the mower housing, utilizing a hanger 82 that is formed as a link. However, as noted previously, the link 82 can be formed as other structures. For example, the hanger 82 can include a bar or strip, an elastic loop, multiple loops or links, a damper device, a spring, or other connective structure.

The cams 70, 73 can also be construed having a different shape, geometry, or construction as compared to those depicted in the Figures. It is appreciated that shape and structure of components described herein, including the cams, may vary between different types of lawnmowers and different types of cutter housings. Accordingly, exemplary embodiments are also intended to include or otherwise cover assemblies that include variations in shape, geometry, or construction as dependent on assemblies lawnmowers with which the lift and assembly of the disclosure is intended to be utilized.

While the subject matter has been described in detail with reference to exemplary embodiments thereof, it will be apparent to one skilled in the art that various changes can be made, and equivalents employed, without departing from the scope of the invention. All related art references discussed in the above Description of the Related Art section are hereby incorporated by reference in their entirety.

What is claimed is:

1. A lift assembly for a lawnmower comprising:
    a mower housing configured to house blades for cutting vegetation;
    a frame located above the mower housing, the frame including two longitudinal extending frame members, and at least one pivot bar extending between the two longitudinal extending frame members, the pivot bar including an arm non-rotatably connected to the pivot bar at a first location on the pivot bar;
    a linear actuator located between the frame members and connected to the pivot bar at the arm such that actuation of the linear actuator causes the pivot bar to rotate about a rotational axis of the pivot bar; and
    a pair of first cams connected to the pivot bar so as to rotate about the rotational axis of the pivot bar when the pivot bar rotates, each of first cams is connected to the pivot bar at a respective one of a pair of second locations on the pivot bar that are spaced away from the first location, and at least one of the first cams including a mower housing attachment element that supports the mower housing such that rotation of the at least one of the first cams varies a distance between the frame and the mower housing.

2. The lift assembly of claim 1, wherein the mower housing attachment element includes at least one hanger connecting the at least one cam to the mower housing, the hanger configured to allow the mower housing to remain a preset downward distance away from the frame while allowing the mower housing to move upward toward the frame against the force of gravity if the mower housing encounters an obstacle during operation of the lawnmower.

3. The lift assembly of claim 1, further comprising a pair of second cams, and
    wherein the at least one pivot bar includes a first pivot bar and a second pivot bar, the pair of first cams are connected to the first pivot bar and the pair of second cams are connected to the second pivot bar, and each of the pair of first cams and pair of second cams includes a mower housing attachment element connected to the mower housing.

4. The lift assembly of claim 3, wherein the frame includes a first link arm and a second link arm, the first link arm connects one of the first cams to one of the second cams, and the second link arm connects another of the first cams to another of the second cams.

5. The lift assembly of claim 4, wherein each mower housing attachment element includes at least one hanger connecting each cam to the mower housing, each hanger is connected between an attachment aperture on each cam and a respective support element on the mower housing.

6. The lift assembly of claim 4, wherein one of the pair of first cams includes a first support arm and a first driving arm, and one of the pair of second cams includes a second support arm and a second driving arm, the first driving arm connected to the second driving arm by the first link arm, and the first support arm and second support arm are connected to the mower housing by a respective mower housing attachment element.

7. The lift assembly of claim 1, wherein at least one of the first cams includes a first driving arm extending in a first direction from an attachment location with the at least one pivot bar, and includes a first support arm extending in a second direction different than the first direction from the attachment location, such that the at least one of the first cams is elbow shaped.

8. The lift assembly of claim 1, wherein:
the frame includes a frame cross member that extends between the two longitudinal extending frame members.

9. The lift assembly of claim 8, wherein the linear actuator, at a first end, is pivotally attached to the frame cross member, and the linear actuator, at a second end, is pivotally attached to the arm such that extension of the linear actuator results in rotation of the arm and pivot bar about a pivot axis of the pivot bar.

10. The lift assembly of claim 1, wherein one of the first cams is located at one end of the pivot bar and another of the first cams is located at an opposite end of the pivot bar.

11. The lift assembly of claim 1, wherein the linear actuator includes a cylinder and a piston.

12. The lift assembly of claim 1, wherein the at least one pivot bar includes a first pivot bar and a second pivot bar both extending between the two longitudinal extending frame members and attached to each of the two longitudinal extending frame members by rotary bearings, a frame cross member is attached to and extends between the two longitudinal extending frame members, the frame cross member is located between the first pivot bar and the second pivot bar, and the linear actuator is rotatably connected to the frame cross member.

13. A lawnmower comprising:
a mower housing lift assembly that includes,
a mower housing that rotatably supports blades for cutting vegetation,
two frame members,
at least one pivot bar extending between the two frame members, the pivot bar including an arm non-rotatably connected to the pivot bar at a first location on the pivot bar,
an actuator provided between the two frame members and connected to the pivot bar at the arm to impart rotation to the pivot bar about a rotational axis of the pivot bar, and
a pair of first cams affixed to the pivot bar at a respective second location on the pivot bar that is spaced away from the first location, each of the first cams rotating about the rotational axis of the pivot bar when the pivot bar rotates, at least one of the first cams including a mower housing attachment element connected to the mower housing such that a distance from the two frame members to the mower housing changes upon rotation of the at least one of the first cams; and
a prime mover operatively connected to the blades so as to rotate the blades during operation.

14. The lawnmower of claim 13, wherein the mower housing attachment element includes at least one hanger connecting the at least one cam to the mower housing, the hanger configured to allow the mower housing to remain a preset downward distance away from the two frame members while allowing the mower housing to move upward toward the two frame members against the force of gravity if the mower housing encounters an obstacle during operation of the lawnmower.

15. The lawnmower of claim 14, further comprising a pair of second cams, and
wherein the at least one pivot bar includes a first pivot bar and a second pivot bar, the pair of first cams are connected to the first pivot bar and the pair of second cams are connected to the second pivot bar, and each of the pair of first cams and pair of second cams includes a respective mower housing attachment element connected to the mower housing.

16. The lawnmower of claim 15, further comprising a first link arm and a second link arm, the first link arm connects one of the first cams to one of the second cams, and the second link arm connects another of the first cams to another of the second cams.

17. The lawnmower of claim 13, wherein the at least one pivot bar includes a first pivot bar and a second pivot bar both extending between the two frame members and attached to each of the two frame members by rotary bearings, a frame cross member is attached to and extends between the two frame members, the frame cross member is located between the first pivot bar and the second pivot bar, and the actuator is rotatably connected to the frame cross member.

18. A lift assembly for a lawnmower, comprising:
a mower housing that houses blades for cutting vegetation;
a frame that includes a frame cross member;
a first pivot bar;
an actuator located between the frame cross member and the first pivot bar and configured to impart rotation to the first pivot bar about a first pivot bar rotational axis;
first cams affixed to the first pivot bar, at respective attachment points on the first pivot bar, so as to rotate with the first pivot bar;
a first mower housing attachment element attached to each of the first cams and configured to support the mower housing at varying height positions dependent on rotational position of the first cams;
a second pivot bar and second cams affixed to the second pivot bar, at respective attachment points of the second pivot bar, so as to rotate with the second pivot bar;
a second mower housing attachment element attached to each of the second cams and configured to support the mower housing at varying height positions dependent on rotational position of the second cams; and
a first link arm and a second link arm, the first link arm connecting one of the first cams to one of the second cams, and the second link arm connecting another of the first cams to another of the second cams, wherein
the first pivot bar includes an arm that is non-rotatably affixed to the first pivot bar at a first location on the first pivot bar, and the actuator is attached at the arm and to the frame cross member such that operation of the actuator results in rotation of the arm and first pivot bar about the first pivot bar rotational axis, and
wherein the respective attachment points for the first cams are spaced away from the first location.

19. The lift assembly of claim 18, wherein the actuator includes a cylinder and a piston, and the piston is configured to be slidably driven within the cylinder to cause the actuator to extend.

20. The lift assembly of claim 18, wherein each of the first and second mower housing attachment elements includes at least one hanger connecting the first and second cams to the mower housing, the at least one hanger is configured to allow the mower housing to remain a preset downward distance away from the frame while allowing the mower housing to move upward toward the frame against the force of gravity the mower housing encounters an obstacle during operation of the lawnmower.

\* \* \* \* \*